Figure 1:
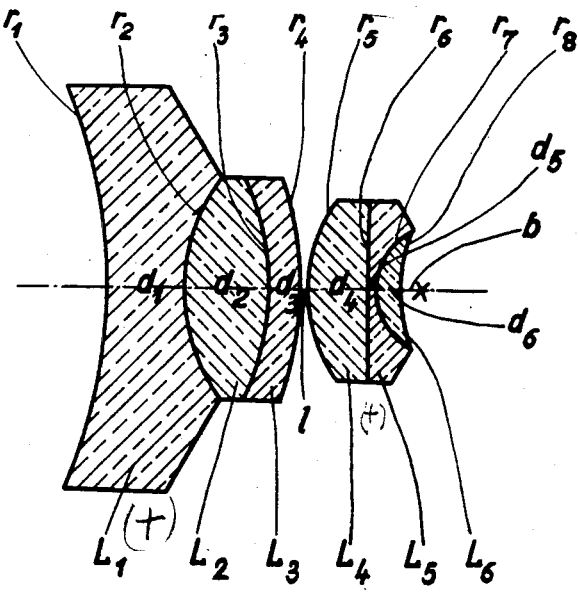

Dec. 13, 1938.  W. MERTÉ  2,140,024
PHOTOGRAPHIC OBJECTIVE
Filed April 1, 1937   2 Sheets—Sheet 1

|  |  | $n_d$ | $\nu$ |
|---|---|---|---|
| $r_1 = -66.7$ | $d_1 = 10.1$ | $L_1 = 1.60817$ | 59.5 |
| $r_2 = +25.3$ | $d_2 = 10.9$ | $L_2 = 1.49266$ | 69.7 |
| $r_3 = -33.9$ | $d_3 = 4.4$ | $L_3 = 1.60817$ | 59.5 |
| $r_4 = -43.3$ | $l = 0.8$ |  |  |
| $r_5 = +20.2$ | $d_4 = 8.1$ | $L_4 = 1.67047$ | 47.2 |
| $r_6 = +602.0$ | $d_5 = 0.98$ | $L_5 = 1.54753$ | 45.9 |
| $r_7 = +8.74$ | $d_6 = 3.3$ | $L_6 = 1.46654$ | 65.4 |
| $r_8 = +21.5$ | $b = 3.16$ |  |  |

Inventor:
Willy Merté

Dec. 13, 1938.   W. MERTÉ   2,140,024
PHOTOGRAPHIC OBJECTIVE
Filed April 1, 1937   2 Sheets-Sheet 2

| | | | $n_d$ | $\nu$ |
|---|---|---|---|---|
| $r_1 = -62.4$ | $d_1 = 3.9$ | $L_1 = 1.60000$ | | 60.9 |
| $r_2 = +23.7$ | $d_2 = 12.65$ | $L_2 = 1.48880$ | | 69.9 |
| $r_3 = -31.6$ | $d_3 = 3.16$ | $L_3 = 1.60000$ | | 60.9 |
| $r_4 = -40.7$ | $l = 0.78$ | | | |
| $r_5 = +20.7$ | $d_4 = 6.28$ | $L_4 = 1.67024$ | | 47.2 |
| $r_6 = -565.0$ | $d_5 = 1.37$ | $L_5 = 1.54753$ | | 45.9 |
| $r_7 = +9.75$ | $d_6 = 4.49$ | $L_6 = 1.46580$ | | 65.4 |
| $r_8 = +23.4$ | $b_1 = 2.34$ | | | |
| $r_9 = -1580.0$ | $b_2 = 7.81$ | | | |
| $r_{10} = \infty$ | $d_7 = 23.42$ | $L_7 = 1.60000$ | | 60.9 |

Inventor:
Willy Merté

Patented Dec. 13, 1938

2,140,024

UNITED STATES PATENT OFFICE 2,140,024

PHOTOGRAPHIC OBJECTIVE

Willy Merté, Jena, Germany, assignor to the firm Carl Zeiss, Jena, Germany

Application April 1, 1937, Serial No. 134,282
In Germany April 9, 1936

5 Claims. (Cl. 88—57)

The present invention, which concerns an objective for photographic and reproduction purposes consisting of two menisci bounded by air, aims at improving the optical efficiency as regards quality of image and area of the image field of a convergent meniscus the convex exterior side of which is in front, by means of a meniscus that is placed in front of, and whose convex side faces the first said meniscus, provision being made that the focal length of this first said, or rear, meniscus does not differ from the focal length of the entire system of lenses by more than one-third of this length, and that the ratio of the radii of curvature of the two air-bounded refractive surfaces of the said rear meniscus approaches the magnitude 1 more nearly than does the ratio of the radii of curvature of the air-bounded refractive surfaces of the said front meniscus. The refractive power of the front meniscus may be considerably smaller than that of the rear meniscus, and the former may even be divergent. The meniscus herein termed the front meniscus is that which faces the object when diminution is concerned; in the case of magnification the object is faced, accordingly, by the other, or rear, meniscus.

A calculation shows that thus can be obtained objectives which have at a ratio of aperture of approximately 1:6 an image field of 80° of good definition. In objectives of this kind, the menisci can have such forms as avoid disturbing reflexes to a very great extent. Moreover, these objectives have the remarkable characteristic of being free of distortion also when a rear diaphragm is used, without this diaphragm having to be placed at an unsuitable distance from the objective.

It is appropriate to compose at least the rear meniscus of three cemented lenses, the medial of the lenses of the rear meniscus being divergent and the two other lenses convergent. The lowest refractive index in the front meniscus is suitably the same as that of the medial lens. The refractive indices of the three lenses of the rear meniscus are conveniently the smaller the further they are in the rear.

Other possibilities of correction suiting the present case are attained by providing behind the rear meniscus an additional refractive member, which may have, for instance, very nearly the shape of a plano-parallel plate.

Figure 2:
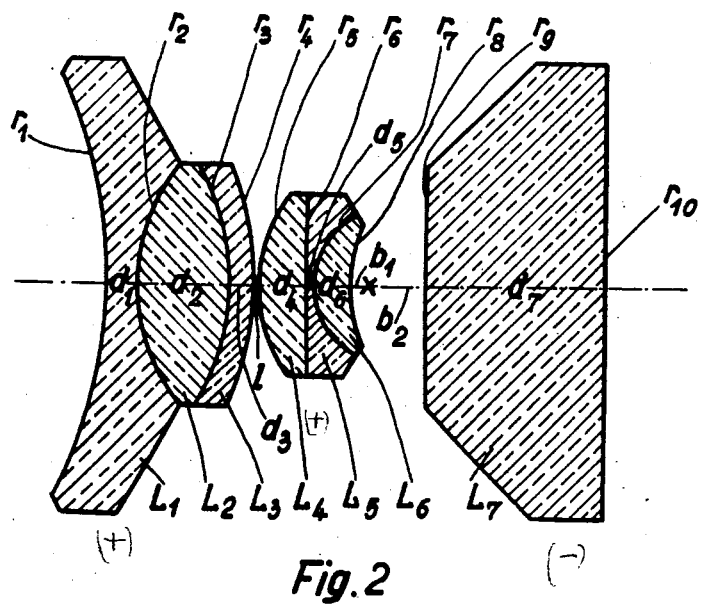

The accompanying drawings, which illustrate the invention, show in Figures 1 and 2 two constructional examples of an objective in a section containing the axis.

Figure 1 represents an objective consisting of two menisci. The meniscus facing the object to be photographed is composed of three cemented lenses $L_1$, $L_2$, $L_3$, and the other meniscus of three cemented lenses $L_4$, $L_5$, $L_6$. The axial distance apart of the two menisci, whose convex sides face each other, is designated $l$. The locus of the diaphragm is at a distance $b$ from the vertex of the lens remotest from the object to be photographed. The radii of the refracting surfaces and the thicknesses of the lenses are designated $r_1$, $r_2 \ldots r_8$ and $d_1$, $d_2 \ldots d_6$, respectively.

Figure 2 represents an objective composed of a three-lens meniscus $L_1$, $L_2$, $L_3$, a three-lens meniscus $L_4$, $L_5$, $L_6$ and a refractive member $L_7$. The axial distance apart of the two menisci, whose convex sides face each other, is designated $l$. The locus of the diaphragm is at a distance $b_1$ from the vertex of the lens surface remotest from the object to be photographed and at a distance $b_2$ from that vertex of the member $L_7$ which faces the said object. The radii of the refracting surfaces and the thicknesses of the lenses are designated $r_1$, $r_2 \ldots r_{10}$ and $d_1$, $d_2 \ldots d_7$, respectively.

The constructional data and the kinds of glass of the said constructional examples are indicated in the following tables, the numerals referring to objectives of a focal length of 100 millimetres.

*First constructionl example (Figure 1)*

| Radii | Thicknesses and distances | Kinds of glass | |
|---|---|---|---|
| | | $n_d$ | $\nu$ |
| $r_1 = -66.7$ | $d_1 = 10.1$ | $L_1 = 1.60817$ | 59.5 |
| $r_2 = +25.3$ | $d_2 = 10.9$ | $L_2 = 1.49266$ | 69.7 |
| $r_3 = -33.9$ | $d_3 = 4.4$ | $L_3 = 1.60817$ | 59.5 |
| $r_4 = -43.3$ | $l = 0.8$ | | |
| $r_5 = +20.2$ | $d_4 = 8.1$ | $L_4 = 1.67047$ | 47.2 |
| $r_6 = +602.0$ | $d_5 = 0.98$ | $L_5 = 1.54753$ | 45.9 |
| $r_7 = +8.74$ | $d_6 = 3.3$ | $L_6 = 1.46654$ | 65.4 |
| $r_8 = +21.5$ | $b = 3.16$ | | |

This objective has at a ratio of aperture of about 1:6 an image field of approximately 80°, and it can be considered as free of reflection, since all images of an axial point which are reflected twice on exterior surfaces of the objective lie to the left of the diaphragm, regardless of whether the said point is at infinity or lies at a distance of only two focal lengths from the objective, in which latter case this point belongs to the configuration of the image in natural size.

*Second constructional example (Figure 2)*

| Radii | Thicknesses and distances | Kinds of glass | |
|---|---|---|---|
| | | $n_d$ | $\nu$ |
| $r_1 = -62.4$ | | | |
| | $d_1 = 3.9$ | $L_1 = 1.60000$ | 60.9 |
| $r_2 = +23.7$ | | | |
| | $d_2 = 12.65$ | $L_2 = 1.48880$ | 69.9 |
| $r_3 = -31.6$ | | | |
| | $d_3 = 3.16$ | $L_3 = 1.60000$ | 60.9 |
| $r_4 = -40.7$ | | | |
| | $l = 0.78$ | | |
| $r_5 = +20.7$ | | | |
| | $d_4 = 6.28$ | $L_4 = 1.67024$ | 47.2 |
| $r_6 = +565.0$ | | | |
| | $d_5 = 1.37$ | $L_5 = 1.54753$ | 45.9 |
| $r_7 = +9.75$ | | | |
| | $d_6 = 4.49$ | $L_6 = 1.46580$ | 65.4 |
| $r_8 = +23.4$ | | | |
| | $b_1 = 2.34$ | | |
| | $b_2 = 7.81$ | | |
| $r_9 = -1580.0$ | | | |
| | $d_7 = 23.42$ | $L_7 = 1.60000$ | 60.9 |
| $r_{10} = \infty$ | | | |

This objective differs from that referred to before substantially in that an additional member, viz. the lens $L_7$, is placed in the rear of the diaphragm. According to position and form of this lens, the objective will also be free of disturbing catadioptric images or produce only an exceedingly low number of such reflection images.

I claim:

1. In a photographic objective, the combination of two menisci which are axially spaced by air and whose convex surfaces face each other, the rear of these menisci being convergent and having a focal length of at least two thirds and at most four thirds of the focal length of the objective, the numerical value of the focal length of the front meniscus lying between five times the focal length of the objective and infinity the radii of curvature of the two air-bounded refractive surfaces of the rear meniscus having a ratio approaching the magnitude 1 more nearly than does the ratio of the radii of curvature of the two air-bounded refractive surfaces of the front meniscus, the radii of curvature of the two air-bounded refractive surfaces of the rear meniscus being greater than one tenth of and smaller than half the focal length of the objective, and the axial distance apart of the front and the rear meniscus being greater than zero and smaller than the axial thickness of the front meniscus.

2. In a photographic objective, the combination of two menisci which are axially spaced by air and whose convex surfaces face each other, the rear of these menisci being convergent and having a focal length of at least two thirds and at most four thirds of the focal length of the objective, the numerical value of the focal length of the front meniscus lying between five times the focal length of the objective and infinity, the rear meniscus consisting of three cemented lenses, the medial of these lenses being divergent and the two other of these lenses being convergent, and the radii of curvature of the two air-bounded refractive surfaces of the rear meniscus having a ratio approaching the magnitude 1 more nearly than does the ratio of the radii of curvature of the two air-bounded refractive surfaces of the front meniscus, the radii of curvature of the two air-bounded refractive surfaces of the rear meniscus being greater than one tenth of and smaller than half the focal length of the objective, and the axial distance apart of the front and the rear meniscus being greater than zero and smaller than the axial thickness of the front meniscus.

3. In a photographic objective, the combination of two menisci which are axially spaced by air and whose convex surfaces face each other, the rear of these menisci being convergent and having a focal length of at least two thirds and at most four thirds of the focal length of the objective, the numerical value of the focal length of the front meniscus lying between five times the focal length of the objective and infinity, the rear meniscus consisting of three cemented lenses, the medial of these lenses being divergent and the two other of these lenses being convergent, the three lenses of the said rear meniscus having indices of refraction which are the smaller the further they are in the rear, and the radii of curvature of the two air-bounded refractive surfaces of the rear meniscus having a ratio approaching the magnitude 1 more nearly than does the ratio of the radii of curvature of the two air-bounded refractive surfaces of the front meniscus, the radii of curvature of the two air-bounded refractive surfaces of the rear meniscus being greater than one tenth of and smaller than half the focal length of the objective, and the axial distance apart of the front and the rear meniscus being greater than zero and smaller than the axial thickness of the front meniscus.

4. In a photographic objective, the combination of two menisci which are axially spaced by air and whose convex surfaces face each other, the rear of these menisci being convergent and having a focal length of at least two thirds and at most four thirds of the focal length of the objective, the numerical value of the focal length of the front meniscus lying between five times the focal length of the objective and infinity, this front meniscus consisting of three lenses, the medial of these lenses having the lowest refractive index of all three lenses, and the radii of curvature of the two air-bounded refractive surfaces of the rear meniscus having a ratio approaching the magnitude 1 more nearly than does the ratio of the radii of curvature of the two air-bounded refractive surfaces of the front meniscus, the radii of curvature of the two air-bounded refractive surfaces of the rear meniscus being greater than one tenth of and smaller than half the focal length of the objective, and the axial distance apart of the front and the rear meniscus being greater than zero and smaller than the axial thickness of the front meniscus.

5. In a photographic objective, the combination of two menisci which are axially spaced by air and whose convex surfaces face each other, the rear of these menisci being convergent and having a focal length of at least two thirds and at most four thirds of the focal length of the objective, the numerical value of the focal length of the front meniscus lying between five times the focal length of the objective and infinity, the radii of curvature of the two air-bounded refractive surfaces of the rear meniscus having a ratio approaching the magnitude 1 more nearly than does the ratio of the radii of curvature of the two air-bounded refractive surfaces of the front meniscus, the radii of curvature of the two air-bounded refractive surfaces of the rear meniscus being greater than one tenth of and smaller than half the focal length of the objective, and the axial distance apart of the front and the rear meniscus being greater than zero and smaller than the axial thickness of the front meniscus, and an additional refractive member disposed in the rear of, and axially spaced by air from, the rear meniscus.

WILLY MERTÉ.